United States Patent

[11] 3,595,274

| [72] | Inventor | Jacques Faisandier<br>32 Bld Felix Faure, 92 Chatillon-Sous-Bagneux, France |
|---|---|---|
| [21] | Appl. No. | 716,047 |
| [22] | Filed | Mar. 26, 1968 |
| [45] | Patented | July 27, 1971 |
| [32] | Priority | Apr. 7, 1967 |
| [33] | | France |
| [31] | | 101,936 |

[54] REVERSE CYCLE VALVE
2 Claims, 4 Drawing Figs.

[52] U.S. Cl. .................................................. 137/625.25,
137/625.21, 251/174, 251/282, 251/283
[51] Int. Cl. ........................................................ F16k 11/06,
F16k 39/04
[50] Field of Search ............................................ 137/625.21,
625.22, 625.23, 625.24, 625.25, 625.26, 625.27,
625.61; 251/174, 175, 281, 282, 283

[56] References Cited
UNITED STATES PATENTS

| 2,560,841 | 7/1951 | Bishop ........................ | 251/282 X |
| 2,736,339 | 2/1956 | Asbury et al. ................ | 251/174 X |
| 2,743,900 | 5/1956 | Holzer et al. ................ | 251/174 |
| 2,832,561 | 4/1958 | Holl ........................... | 251/174 |
| 3,246,667 | 4/1966 | Pemberton .................. | 251/174 X |
| 2,653,003 | 9/1953 | Overbeke ................... | 137/625.21 |

Primary Examiner—Henry T. Klinksiek
Attorney—Fishman and Van Kirk

ABSTRACT: A reverse cycle valve having a flat internal chamber, the flat valve member of which is pressed against a port-forming plate by pistons, said pistons being lodged in the stationary part of the valve and pressing through the medium of a floating plate.

3,595,274

REVERSE CYCLE VALVE

BACKGROUND OF THE INVENTION

The invention relates to balanced reverse cycle valves. The present invention may be applied as well to valves including a plane pressure plate and a flat parallelpipedic sliding valve member as well as to valves including a cylindrical or annular pressure plate and a rotary valve member.

In the prior art are known reverse cycle valves having an internal chamber of flat parallel shape including a pressure plate and a port-forming plate, parallel one with the other, and a valve member also of flat parallelpiped shape. Such valve members have two faces slidably engaging said plates respectively, said faces being pressed on said faces by means of springs lodged in said valve member, and pressing pistons on to the pressure plate.

SUMMARY OF THE INVENTION

The present invention is an improvement of such valves, and has for its object a more simplified construction and requiring a more simplified machine finishing of the cylinders of the pistons, said pistons no longer being submitted to forces which tend to cause canting.

With these objects in view, the pistons, instead of being lodged in the sliding valve member, are lodged, according to the present invention, in the stationary part, that is in the body of the valve, and press the sliding member against the port-forming plate through the medium a floating plate.

BRIEF DESCRIPTION OF THE DRAWING

The invention will be further described by way of examples, but in several nonlimitative embodiments, with reference to the accompanying drawings, in which.

DESCRIPTION OF A PREFERRED EMBODIMENT

Figure 1:
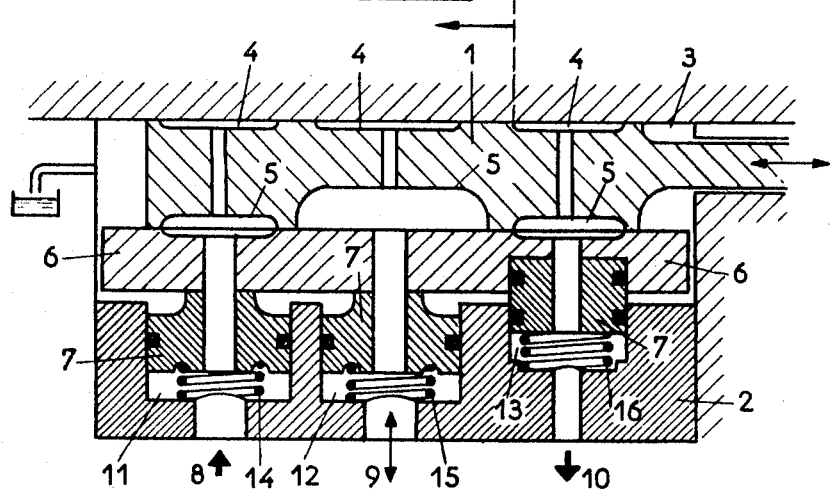
FIG. 1 is a diagrammatic cross section along the median plane of the sliding valve, having the direction of the displacement.

In FIG. 1, reference 1 is the sliding valve member, 2 is the body of the valve, said body constituting a port-forming member. The sliding member slides on the surface 3, which is integral, or not with the body 2.

Balancing surfaces on the sliding-valve member 1 are indicated at 4 and 5 and the sliding valve member slides between the pressure surface 3, and the confronting surface of a floating plate 6, which is pressed against the sliding valve member by means of the intermediary of the pistons 7. The inlet to the valve is indicated at 8, the outlet to a motor or similar device is indicated at 9, and the return connection to a reservoir is indicated at 10.

The pistons are lodged in cylinders 11, 12 and 13 respectively and are biased by springs 14, 15 and 16 respectively.

Normally the three pistons 7 press on the surface of the plane plate 6; but, with the view to indicate another embodiment, the piston at the right in the figure presses on the bottom of a cylindrical cavity in plate 6 thereby assisting in guiding the floating plate 6.

Anyway, and independently of such guide means, the plate 6 may be laterally guided by guide means, which are not shown in FIG. 1.

Figure 2:
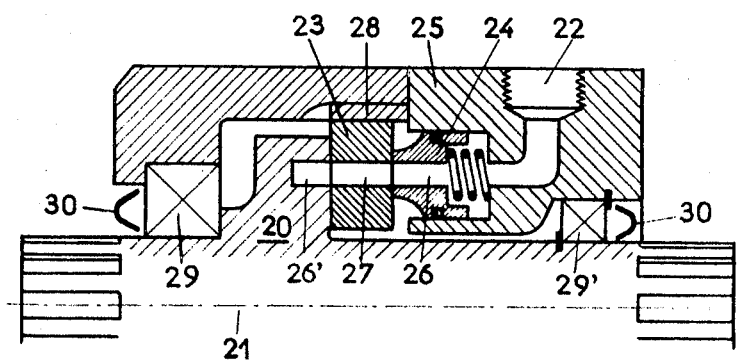
FIG. 2 is a diagrammatic axial cross section of a rotary valve, bearing on roll bearings.

FIG. 2 discloses an embodiment of the invention in which the sliding movement is a rotary movement, the displaceable valve member 20 being mounted for rotation about axis 21.

The axial cross section is determined by the median axial plane of an outlet or inlet 22, which may be considered as either an outlet to the reservoir or to the motor, or as an inlet for the pressure.

The floating plate of the FIG. 1 is in the embodiment of FIG. 2 annular and designated by 23. Plate 23 is pressed on the rotary slider 20 by means of pistons such as 24, only one of said pistons being visible on the figure.

Said pistons are lodged in a part 25 of the stator, which constitutes the port-forming member, and as in FIG. 1 these pistons are provided with an axial bore 26 to allow communication between the inlet or outlet 22 and a groove 26' in the rotary slider 20, said groove securing communication with a pressure inlet or with an outlet to the reservoir, slider 23 being provided with bores such as 27. 28 is a lateral guide means for slider 23.

In the present embodiment the rotary valve slider 23 bears on a pressure surface provided by thrust ball bearing 29, tightening means being diagrammatically indicated at 30.

The functioning of the embodiment of FIG. 2 is as follows:

When the rotary slider 20 rotates, the groove 26, secures successively the communication with an outlet to the motor and with the reservoir—the borings 27 of the annular member 23 being disposed along a circle having its center on the axis 21.

Figure 3:
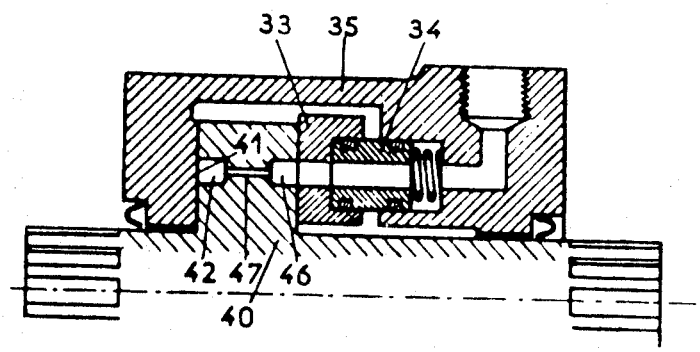
FIG. 3 is a diagrammatic cross section of a rotary valve hydraulically balanced.

The embodiment according to FIG. 3 is the same as the embodiment represented in FIG. 2, but with the following differences:

The pistons 34 penetrate into cylinders disposed in the annular member 33, and thus contribute to the guiding of the floating member 33, thereby making it possible to dispense with the guide means 28 of FIG. 2.

Furthermore, the thrust bearing 29 of FIG. 2 may be dispensed with, the rotary valve member 40 bearing on a pressure surface provided by the stator 35, and including a balancing surface 41, which is exposed to the pressure in chamber 46. The surfaces exposed to the pressure are to be properly sized to secure hydraulic equilibrium for the rotor.

Figure 4:
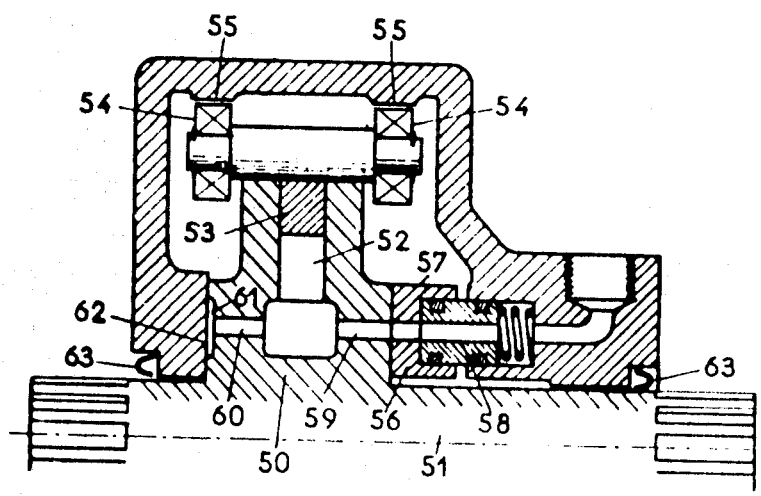
FIG. 4 is a diagrammatic cross section showing an embodiment in a radial multicylinder hydraulic motor in which the rotor and the distributor are constituted by a single member.

In the embodiment represented in FIG. 4, the rotor 50 of a radial multicylinder motor which rotates about the axis 51, includes the distributor of the present invention. In FIG. 4, 52 is one of the cylinders, the piston 53 of each cylinder bearing, by the intermediary of a roller bearing 54 on a cam surface 55. Such motors are well known in the art.

According to the invention, the annular floating member 56 presses on the port-forming surface 57 of the rotary slider 50, and is submitted to the forces exerted by the pistons, only one of which is shown in 58. Each piston penetrates into the annular member 56 thereby guiding and centering the same.

The boring 59 secures the inlet and outlet of the pressure liquid relative to the corresponding cylinder, and, in continuation of which, the boring 60 secures the communication with the cavity 61 which secures the balancing surface 62.

In such embodiment, the thrust bearing 29 of FIG. 2 is dispensed with the pressure surface being provided by the rotator.

I claim:

1. A valve comprising:
   a body defining an internal chamber, said chamber having a plane pressure surface at one side thereof, said body further defining a plurality of cylinders communicating with said chamber at the side thereof disposed oppositely to said plane surface, said body also defining a plurality of ports in communication with said cylinders whereby fluid may be delivered to and received from said chamber;
   a displaceable conduit-defining member positioned in said chamber, said displaceable member having parallel oppositely disposed sliding surfaces;
   a floating plate member disposed in said chamber between said displaceable member and side of said chamber having said cylinders formed therein, said plate member having a plurality of passages therethrough, said passages being substantially aligned with said cylinders, movement of said displaceable member relative to said plate member selectively establishing and disrupting fluid communication between certain of said passages;

piston means disposed in the cylinders in said body; and spring means urging said piston means into direct contact with said plate member whereby said plate member is urged against said displaceable member by said pistons to thereby provide sealing between the sliding surfaces of the valve.

2. The apparatus of claim 1 wherein said plate member further comprises:

at least a first cavity formed in the face of said plate member which is juxtapositioned to the side of said chamber in which said cylinders are formed, said cavity being commensurate in shape with a corresponding piston said spring means urging said piston into said cavity to thereby guide said plate member.